US012731564B2

(12) United States Patent
Zhou et al.

(10) Patent No.: US 12,731,564 B2
(45) Date of Patent: Sep. 8, 2026

(54) SONG GENERATION BASED ON A TEXT INPUT

(71) Applicant: Microsoft Technology Licensing, LLC, Redmond, WA (US)

(72) Inventors: Guang Zhou, Redmond, WA (US); Wei Wang, Redmond, WA (US); Jiawei Li, Redmond, WA (US); Peijun Xia, Redmond, WA (US); Xianchao Wu, Tokyo (JP); Lu Yang, Redmond, WA (US); Yuanchun Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1026 days.

(21) Appl. No.: 17/614,128

(22) PCT Filed: Apr. 26, 2020

(86) PCT No.: PCT/US2020/030000
§ 371 (c)(1),
(2) Date: Nov. 24, 2021

(87) PCT Pub. No.: WO2020/251664
PCT Pub. Date: Dec. 17, 2020

(65) Prior Publication Data

US 2022/0223125 A1 Jul. 14, 2022

(30) Foreign Application Priority Data

Jun. 14, 2019 (CN) ......................... 201910516827.0

(51) Int. Cl.
*G10H 1/00* (2006.01)
*G06F 40/35* (2020.01)

(52) U.S. Cl.
CPC .......... *G10H 1/0025* (2013.01); *G06F 40/35* (2020.01); *G10H 2210/121* (2013.01)

(58) Field of Classification Search
CPC . G10H 1/0025; G10H 2210/121; G06F 40/35
See application file for complete search history.

(56) References Cited

U.S. PATENT DOCUMENTS

2014/0174279 A1 6/2014 Wong et al.
2020/0097502 A1* 3/2020 Trim ................ G06F 16/24578
(Continued)

FOREIGN PATENT DOCUMENTS

CN 1326303 A 12/2001
CN 104391980 A * 3/2015 ............ G06F 16/61
(Continued)

OTHER PUBLICATIONS

Office Action Received for Chinese Application No. 201910516827, mailed on Mar. 27, 2024, 8 pages (English Translation Provided).
(Continued)

*Primary Examiner* — Jianchun Qin
(74) *Attorney, Agent, or Firm* — Schwegman Lundberg & Woessner, P.A.

(57) ABSTRACT

The disclosure provides a method and an apparatus for song generation. A text input may be received. A topic and an emotion may be extracted from the text input. A melody may be determined according to the topic and the emotion. Lyrics may be generated according to the melody and the text input. A song may be generated at least according to the melody and the lyrics.

13 Claims, 13 Drawing Sheets

(56) References Cited

U.S. PATENT DOCUMENTS

| | | | | |
|---|---|---|---|---|
| 2020/0188790 | A1* | 6/2020 | Galuten | A63F 13/212 |
| 2021/0312897 | A1* | 10/2021 | Ackerman | G11B 27/031 |

FOREIGN PATENT DOCUMENTS

| | | | |
|---|---|---|---|
| CN | 105070283 | A | 11/2015 |
| CN | 107799119 | A | 3/2018 |
| CN | 108806655 | A | 11/2018 |
| CN | 109086408 | A | 12/2018 |
| CN | 109716326 | A | 5/2019 |
| CN | 109741724 | A | 5/2019 |
| JP | 2014170146 | A | 9/2014 |
| WO | 2018200268 | A1 | 11/2018 |
| WO | 2018232623 | A1 | 12/2018 |

OTHER PUBLICATIONS

"Office Action and Search Report Issued in Chinese Patent Application No. 201910516827.0", Mailed Date: Aug. 31, 2023, 18 Pages.

Son, et al., "Korean Song-lyrics Generation by Deep Learning", In Proceedings of the 4th International Conference on Intelligent Information Technology, Feb. 20, 2019, pp. 96-100.

"International Search Report and Written Opinion Issued in PCT Application No. PCT/US20/030000", Mailed Date: Jul. 17, 2020, 19 Pages.

* cited by examiner

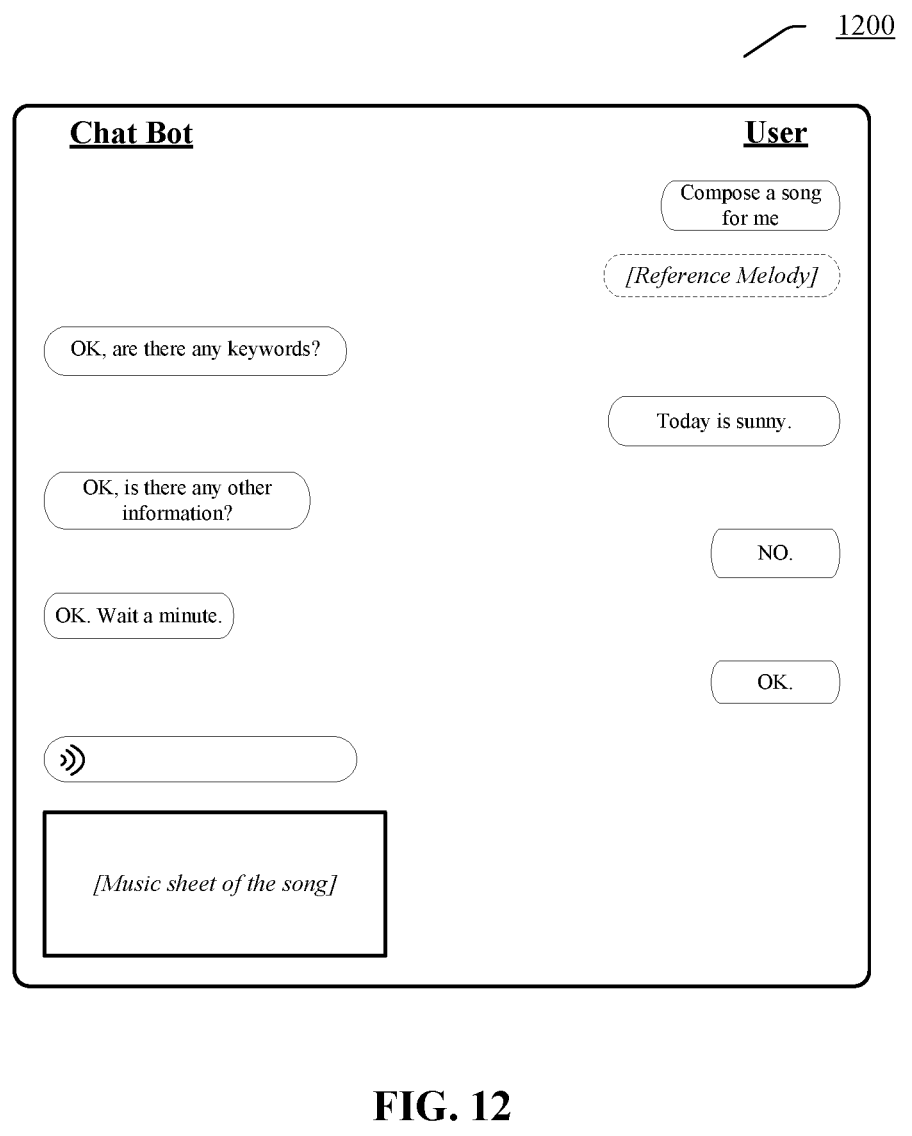

1200

Chat Bot

User

Compose a song for me

[Reference Melody]

OK, are there any keywords?

Today is sunny.

OK, is there any other information?

NO.

OK. Wait a minute.

OK.

[Music sheet of the song]

FIG. 12

SONG GENERATION BASED ON A TEXT INPUT

CROSS-REFERENCE TO RELATED APPLICATION

This application is a U.S. National Stage Filing under 35 U.S.C. 371 of International Patent Application Serial No. PCT/US2020/030000, filed Apr. 26, 2020, and published as WO 2020/251664 A1 on Dec. 17, 2020, which claims priority to Chinese Application No. 201910516827.0, filed Jun. 14, 2019, which applications and publication are incorporated herein by reference in their entirety.

BACKGROUND

Automatic song generation intends to simulate songwriting of human. Generally, automatic song generation can be achieved through techniques such as machine learning, deep learning, etc. For example, a large number of parameters and song pairs may be used to train a song generation model, and the parameters may include emotion, rhythm, music style, musical instrument, chord, lyrics, etc. of a song. When receiving different parameter information set or input by a user, a trained song generation model may compose different songs.

SUMMARY

This summary is provided to introduce a selection of concepts that are further described below in the Detailed Description. It is not intended to identify key features or essential features of the claimed subject matter, nor is it intended to be used to limit the scope of the claimed subject matter.

Embodiments of the disclosure provide a method and an apparatus for song generation. A text input may be received. A topic and an emotion may be extracted from the text input. A melody may be determined according to the topic and the emotion. Lyrics may be generated according to the melody and the text input. The song may be generated at least according to the melody and the lyrics.

It should be noted that the above one or more aspects include the following detailed description and features specifically pointed out in the claims. The following description and the appended drawings set forth in detail certain illustrative features of the one or more aspects. These features are merely indicative of various ways in which the principles of the various aspects can be implemented, and the disclosure is intended to include all such aspects and equivalent transformations thereof.

BRIEF DESCRIPTION OF THE DRAWINGS

The disclosed aspects will hereinafter be described in connection with the appended drawings that are provided to illustrate and not to limit the disclosed aspects.

FIG. 12 illustrates an exemplary interface for generating a song during a chatting process with a chat bot according to an embodiment.

DETAILED DESCRIPTION

The present disclosure will now be discussed with reference to various exemplary embodiments. It should be understood that the discussion of the embodiments is merely intended to enable a person skilled in the art to understand and thus practice the embodiments of the present invention, and not to limit the scope of the disclosure.

In the existing song generation system, only when a user manually sets various parameters for generating songs, such as emotion, rhythm, music style, instrument, chord, lyrics of a song, etc., a song can be generated by the song generation system according to parameter information set by the user. However, it is difficult for the user, especially for those without music knowledge, to manually set these parameters. In addition, for users with or without music knowledge, it is complicated and time-consuming to manually set the various parameters described above.

In order to solve the problem described above, an embodiment of the present disclosure proposes that in a process of automatically generating a song, a song can be produced automatically with only text input and optional audio input provided by a user, without the user manually setting various parameters of the song. The song generation method implemented according to the disclosure may receive, for example, a text input provided by a user, automatically extract a topic and an emotion from the text input, automatically determine a melody according to the topic and the emotion, automatically generate lyrics according to the melody and the text input, and automatically generate a song according to the melody and the lyrics. Through the above operations, the song generation method of the disclosure enables a user to quickly generate a song through simple operations, and it is not required for the user to have music knowledge.

Figure 1:
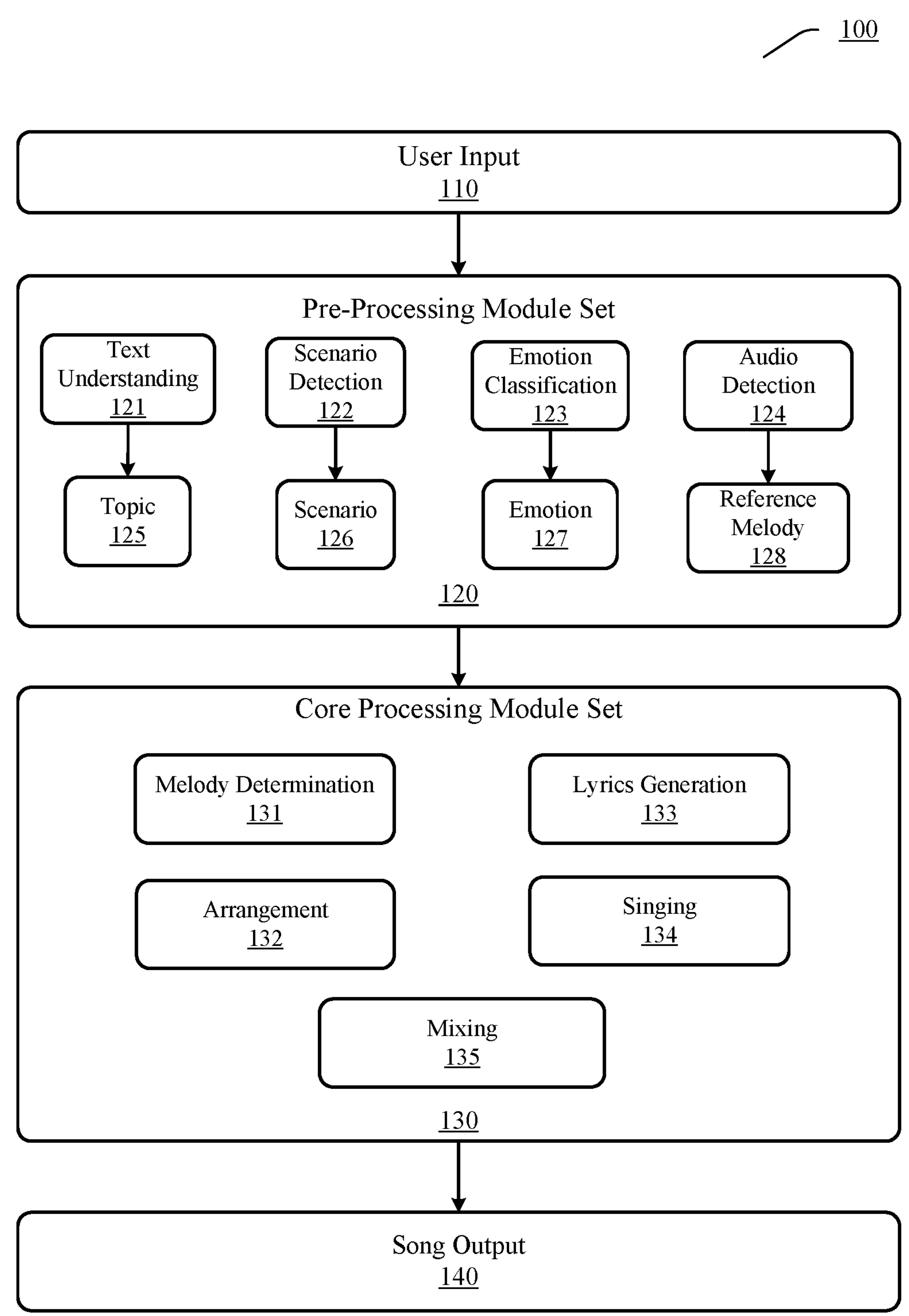
FIG. 1 illustrates an exemplary song generation system according to an embodiment.

FIG. 1 illustrates an exemplary song generation system 100 according to an embodiment.

In a song generation system 100, a user input 110 may be received. Herein, the user input 110 may include text input as well as optional audio input. The text input may include keywords or sentences for generating a song, for example, the text input may be "Today is sunny", so that the song generation system may generate a song based on the text input. The audio input may include a piece of audio with a reference melody, which is used to generate a melody of a song, for example, the audio input may be a piece of music audio hummed or uploaded by a user. The user may provide the user input 110 through a variety of suitable input devices. For example, a text input is provided through a text input device such as a keyboard, a tablet, a touch screen, etc., an audio input is provided through an audio input device such as a microphone, a recorder, etc., or through uploading an audio file, etc., and so on.

In an implementation, the user input 110 is provided to a pre-processing module set 120, which includes at least one or more modules of a text understanding module 121, a scenario detection module 122, an emotion classification module 123, and an audio detection module 124.

In some examples, the text understanding module 121 may process the text input in the user input 110 to extract a topic 125 in the text input, for example, extract the topic by identifying keywords in the text input using any suitable natural language processing technique. For example, if the text input is "Today is sunny", the extracted subject could be "Good weather." In some examples, a large number of <keyword, topic> pairs may be used to perform off-line training on the text understanding module 121. When applied, the trained text understanding module 121 may output topics based on keywords extracted from text input.

The scenario detection module 122 may identify an application scenario 126 of a song. For example, a scenario is determined by using any suitable scenario recognition technique based on a user input 110 and/or context information such as time, place, environment, and so on. For example, if a time indication is "December 25", it may be determined that the scenario where the song is applied is Christmas. For another example, if a location indication is "XXX Bar", it may be determined that the scenario where the song is applied is a bar.

In some examples, an intention detection model (not shown in the figure) may be utilized to identify an intention of a user based on the topic 125. For example, if the extracted topic is "Merry Christmas", an intention of the user may be identified as "Making a song for Christmas". Further, the intention of the user may be identified based on the topic 125 and the scenario 126 by using an intent detection model. For example, if the topic 125 is "Happy Holidays" and the detected scenario 126 is Christmas, the intention of the user may be identified as "Making a song for Christmas". In some embodiments, a large number of <keyword or topic, scenario, intention> sets may be used to perform off-line training on an intention detection model, where the intention detection model may be implemented by a deep neural network. At the time of application, an intention of user may be output by providing the trained intention detection model with keywords, topics, scenarios, etc. obtained from the input of the user. In some examples, the intention detection model may also detect the intention of the user based on a topic extracted from a response of a third party communicating or chatting with the user, where the third party may be a virtual character, such as a chat bot. The intention of the user may be output by inputting topics extracted from the user's messages and/or responses from a third party to the trained intent detection model. In some examples, when identifying the user's intention, the response of the third party may be empty, that is, there may be no response from the third party.

In an implementation, the emotion classification module 123 may use any suitable text emotion analysis model to perform emotion analysis on the text in user input 110 to obtain an emotion 127 corresponding to the text. For example, a vector representation of a text may be obtained by using a text embedding layer in a text emotion analysis model, and a multi-dimensional emotion category label corresponding to the vector representation of the text may be obtained by a Softmax layer, where each dimension represents a probability of an emotion. For example, the multi-dimensional emotion category label may be a 32-dimensional emotion category label based on the Plutchik emotion wheel. In some examples, a large number of <keyword, emotion> pairs may be used to perform off-line training on the emotion classification module 123. In application, emotions may be output by providing keywords to the trained emotion classification module 123.

In one implementation, if the user input 110 includes an audio input with a melody, the audio detection module 124 may identify the melody in the audio input as a reference melody 128. This reference melody 128 may be used as a part of the melody of the song to be generated, such as an initial bar, and be further used to generate other parts of the melody. In some implementations, the audio input with melody may be provided by the user through humming or by the user through uploading a piece of audio.

The output obtained through the processing of each module in the pre-processing module set 120, such as the topic 125, the emotion 127, the optional intention identified according to the topic 125 and the scenario 126, the optional reference melody 128, etc., may be provided to a core processing module set 130.

In an embodiment of the disclosure, the core processing module set 130 may comprise a melody determination module 131, an arrangement module 132, an lyrics generation module 133, an singing module 134 and a mixing module 135.

In an implementation, the melody determination module 131 may determine the melody of the song based on the topic 125 and the emotion 127. In other examples, the melody determination module 131 may further determine the melody of the song based on the reference melody 128. For example, the reference melody 128 may be used as the initial bar of the melody of the song to be determined, and the melody determination module 131 may further determine other bars of the melody based at least on the reference melody 128.

In the embodiment of the disclosure, the arrangement module 132 may use the selected one or more musical instruments to perform multi-track arrangement on the melody determined in the melody determination module 131 to generate at least one arrangement track.

In an implementation, the lyrics generation module 133 may generate the lyrics according to the text input in the user input, such as the topic 125 or keywords, the emotion 127 extracted from the text input, and the melody determined in the melody determination module 131. For example, for each bar of the melody, the lyrics generation module 133 may generate at least one candidate lyrics according to the topic 125 or keywords and the emotion 127, and select a candidate lyrics matching the bar of the melody from the at least one candidate lyrics, such as select a candidate lyrics matching a length of the bar.

In one implementation, the singing module 134 may generate a singing track according to the melody determined at the melody determination module 131 and the lyrics generated at the lyrics generation module 133. In an embodiment of the disclosure, generating a singing track may include singing the generated lyrics with sound of a singer according to the melody. In some examples, the singer may be a virtual character, such as a chat bot, an artificial intelligence (AI) assistant, etc., where the sound of the virtual character may be a synthetic electronic sound. In other examples, the singer may be a real person, such as a vocalist or the user himself, where the sound of the singer may be generated based on a real sound of the real person.

In one implementation, the mixing module 135 integrates at least one arrangement track generated in the arrangement module 132 and the singing track generated in the singing module 134 to generate a playable song.

In an embodiment of the disclosure, a song output 140 may include a playable song and optionally a music sheet of the song. The music sheet includes at least the melody determined at the melody determination module 131 and/or the lyrics generated in the lyrics generation module 133. In some examples, the playable song in the song output 140 may be output by any suitable audio output device, such as a speaker, a headphone, etc. In other examples, the music sheet in the song output 140 may be presented to the user through a display device of a terminal.

It should be understood that all components or modules shown in FIG. 1 are exemplary, and various modifications may be made to the song generation system in FIG. 1 according to actual design and demands. The term "exemplary" used in this application means serving as an example, illustration, or description. Any embodiment or design described as "exemplary" in this application should not be construed as preferred or advantageous over other embodiments or designs. Rather, the use of an exemplary term is intended to convey the idea in a specific manner. In addition, "a" and "an" items used in this application and the appended claims usually mean "one or more", unless otherwise specified or clear from the context that it is a singular form.

Figure 2:
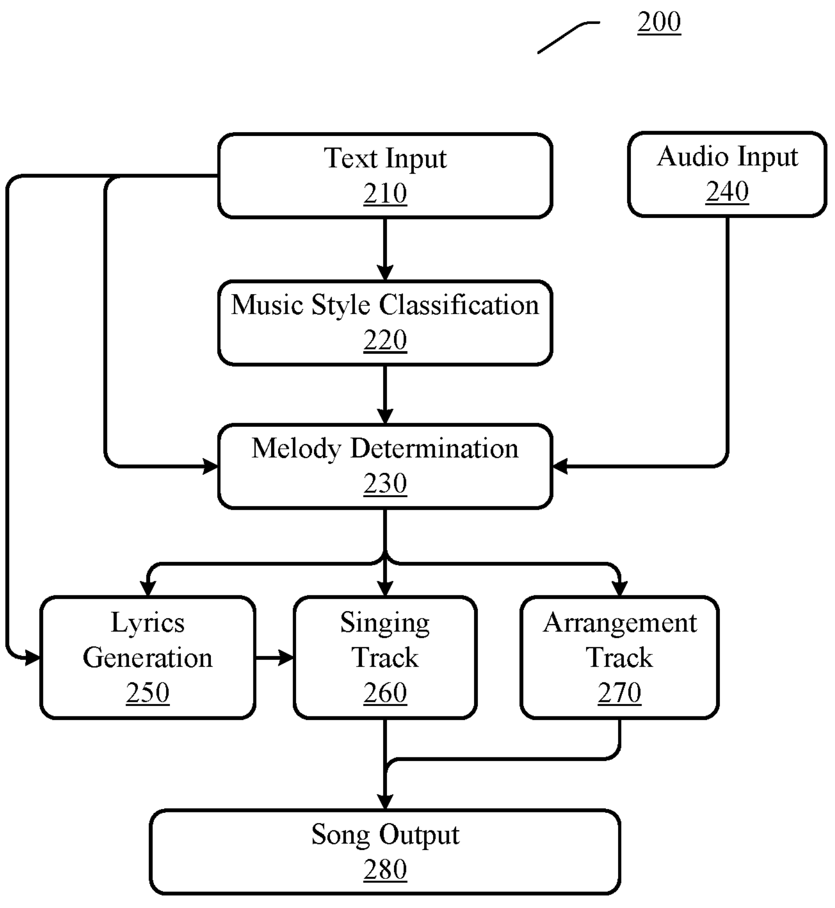
FIG. 2 illustrates an exemplary song generation process according to an embodiment.

FIG. 2 illustrates an exemplary song generation process 200 according to an embodiment. The exemplary song generation process 200 may be performed by the song generation system in FIG. 1.

At block 210, a text input is received, such as a text input provided by a user.

At block 220, the music style of the song is determined by the music style classifier based on the text input. In some examples, the music style may be determined based on topics and emotions extracted from the text input. In other examples, the music style may be determined according to the intention and emotion of a user, where the intention of a user is identified based on the extracted topic and the detected application scenario. In the embodiments of the disclosure, the musical style may include, but is not limited to, any of classical, ancient style, folk songs, nursery rhymes, jazz, blues, pop, rock, lyric, etc. In some examples, different music styles may correspond to different rhythms, arrangements, instruments, etc. For example, the jazz style may correspond to the musical instrument of saxophone, the ancient style may correspond to the musical instrument of Erhu, GuZheng, etc., the folk song may correspond to the musical instrument of guitar, etc.

At block 230, the melody may be determined based on the topic and emotion extracted from the text input and/or the music style determined at block 220. In some examples, determining the melody may further include determining a rhyme sequence according to the music style determined at block 220; determining a chord progression sequence according to the emotion extracted from the text input in block 210; and determining the melody according to the rhyme sequence and the chord progression sequence.

In some examples, optionally, the process 200 may receive an audio input 240. Thus, at 230, melody of the song may be further determined based on the reference melody extracted from the audio input. For example, the reference melody detected from the audio input at block 240 is used as a part of the melody of the song to be generated, such as an initial bar, and other bars of the melody are further determined based on the reference melody, topic, emotion and/or music style. In examples herein, the audio input may be provided by the user through humming or by the user through uploading a piece of audio. It should be understood that the audio input may also be provided in any other suitable manner. In other examples, the reference rhythm extracted from the detected reference melody may be used as part of the rhythm used to generate the melody of the song, and other parts of the rhythm are generated based on this part of the rhythm, for generating the melody of the song.

In some examples, the melody determined at block 230 is provided to block 250 to generate lyrics, provided to block 260 to generate a singing track, and provided to block 270 to generate an arrangement track.

In block 250, lyrics may be generated according to the text input from block 210 and the melody from block 230. Specifically, for each bar of the melody, the content of the lyrics is generated according to the text input, such as generating at least one piece of candidate lyrics, and the length of the lyrics is determined according to the melody, such as a candidate lyrics matching the length of the bar of the melody is selected from the at least one piece of candidate lyrics. Further, generating candidate lyrics may be achieved by extracting a keyword and an emotion from text input, and optionally obtaining a topic, and generating candidate lyrics according to the keyword or topic and the emotion. In addition, a topic and an emotion extracted from the text input can be extended, such as semantically extended to obtain a topic extension set and an emotion extension set, and candidate lyrics is further generated based on the topic extension set and emotion extension set. For example, if the text input is "Today is sunny", the keyword "sunny" can be extracted, and the topic "Good weather" is extracted, and the emotion is extracted as "Happy". Optionally, a keyword may be directly used as the extracted topic, or a topic may be obtained based on the keyword in the text input through a trained model. Further, a topic and an emotion may be semantically expanded, for example, the topic "good weather" is expanded to include a topic extension set including "good weather, sunny weather, warm sunshine, light breeze", etc., and the emotion "happy" is expanded to an emotion extension set including "serenity, joy, ecstasy, love, optimism", etc. In some examples, emotion extension may be based on the association between various emotions, for example, according to the distance between various emotions on Plutchik's emotion wheel. For example, if the extracted emotion is "sadness", the emotion "sadness" may be extended to the emotion extension set including "sorrow, grief, regret", etc, based on the distance of other emotions and the emotion "sadness" on the emotion wheel. Based at least on the topic extension set and the emotion expansion set, a piece of candidate lyrics may be generated, such as "sunlight brings warmth, breeze brings happiness".

In block 260, a singing track may be generated according to the melody from block 230 and the lyrics from block 250. In some examples, generating a singing track may be implemented by singing the lyrics with sound of a singer according to a melody.

At block 270, the melody from block 230 may be arranged to generate an arrangement track. In some examples, arranging the melody includes performing multi-track arrangement on the melody based on a given or selected instrument set, in which each track may correspond to a musical instrument. With a given or selected instrument set, the multi-track arrangement process may arrange for respective parts or bars of the melody to generate an arrangement track, and align different arrangement tracks in time with respective bars of the melody. In some examples, during the multi-track arrangement process, the arrangement of the current bar of the melody on each track may be as follows: for the track is arranged within the current bar of the melody based on the current bar of the melody (for example, as the main melody of the current time) and a note sequence played by each instrument in all the instruments generated in the previous bar of the melody. In one implementation, the multi-track arrangement process may be implemented through a machine learning model, such as a long short-term memory (LSTM) sequence model.

In some examples, the instrument set is selected according to the determined music style, extracted emotions, and/or other features from the user input. For example, different music styles or emotions may correspond to different musical instruments, so that corresponding musical instruments may be selected according to the determined music styles or emotions. For example, a corresponding instrument set may be retrieved according to the music style or emotion in a knowledge map created in advance in the form of <music style/emotion, instrument 1, instrument 2, . . . , instrument n> or in a way that music style/emotion is connected to the corresponding instrument set. For example, slow and smooth violin track usually means sadness, while fast-exciting piano track usually represents a cheerful feeling; drum kit is usually considered suitable for rock, guitar is often considered suitable for folk songs, and so on. In other examples, for each music style, there may also be a proportion of each instrument in the instrument set corresponding to the music style in the knowledge graph, for example, shown in the knowledge map in the exemplary form of <music style, instrument 1 (a %), instrument 2 (b %), . . . , instrument n (c %)>.

Figure 11A:
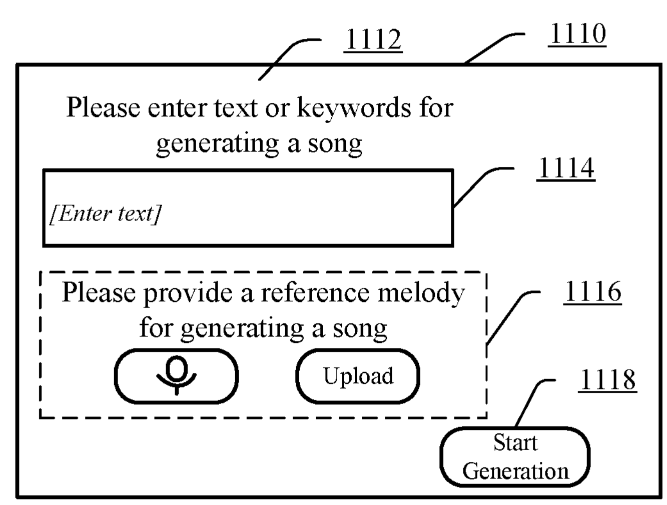
FIGS. 11A-11C illustrate an exemplary interface of an application for generating a song according to an embodiment.
Figure 11B:
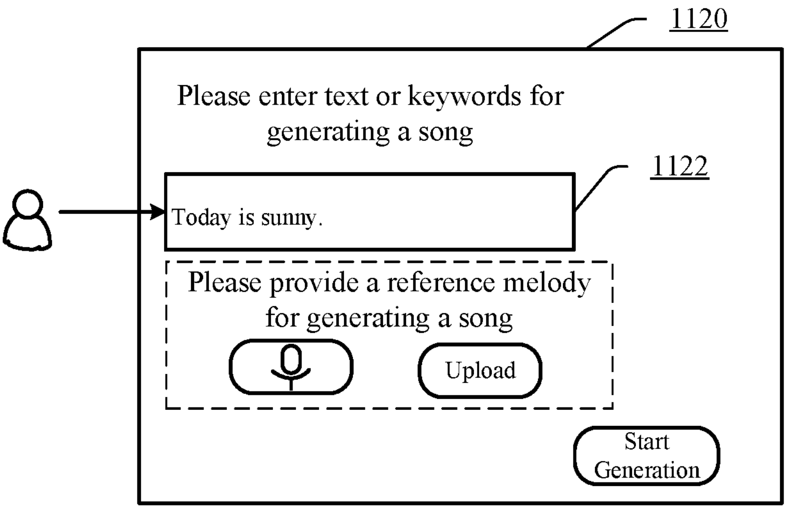
Figure 11C:
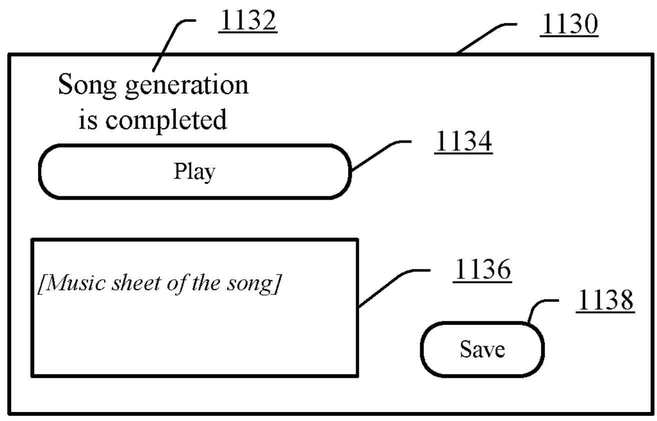

Further, the singing track generated at block 260 and the arrangement track generated at block 270 are mixed together, for example, by using any appropriate mixing technique (not shown in the figure) to obtain a playable song. At block 280, the song output includes a playable song and optionally a song sheet of this song, where the song sheet may include the melody determined at block 230 and/or the lyrics generated at block 250. In some examples, a playable song may be provided through direct playing, and a music sheet may be provided through presenting on the display. In other examples, a playable song and a music sheet may be provided through a link. In still other examples, the song output at block 280 may be provided in a stand-alone application, such as shown in FIGS. 11A-11C below, or may be provided in a human-machine interaction conversation, such as shown in FIG. 12 below.

It should be understood that the operations or steps in all the blocks shown in FIG. 2 are exemplary, and all operations or steps in FIG. 2 may be added, reduced, replaced, or modified according to the actual design or demands.

Figure 3:
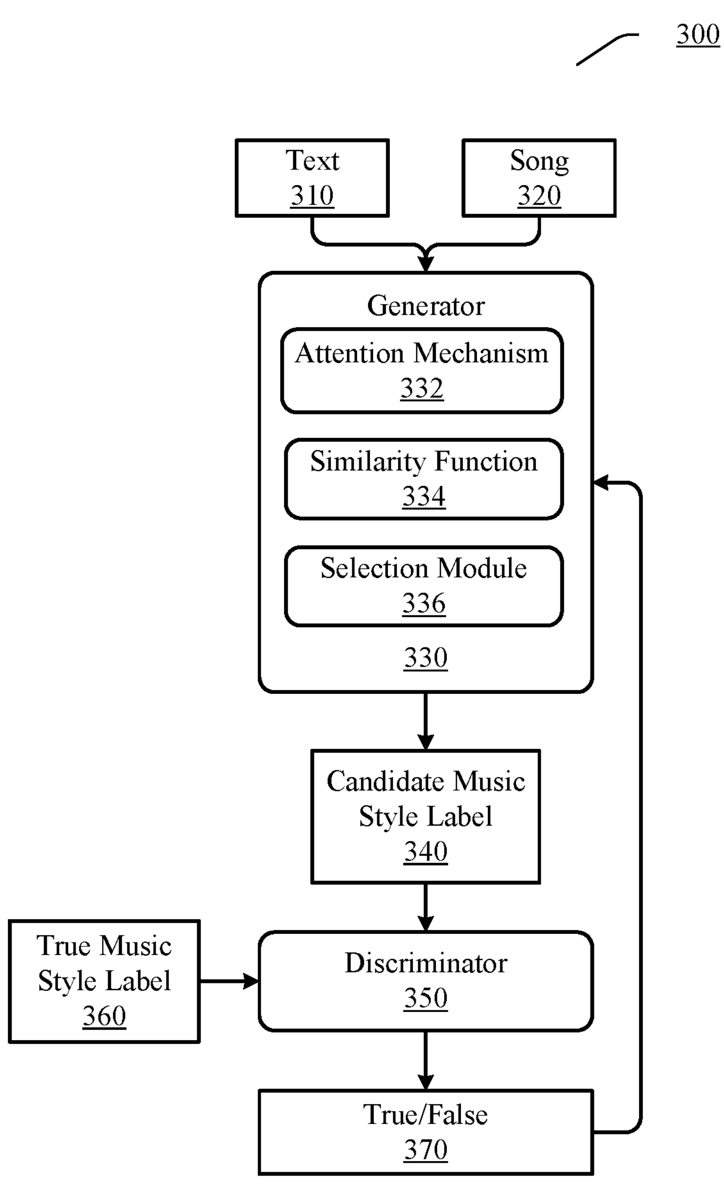
FIG. 3 illustrates an exemplary training process for a music style classification module according to an embodiment.

FIG. 3 illustrates an exemplary training process 300 for a music style classification module according to an embodiment. The training process 300 may be an adversarial training process. In this exemplary training process 300, a large number of <text, true music style label> pairs may be used to perform off-line training on the music style classification module, so that in application, the trained music style classification module may output the music style label of songs to be generated based on the text input of the user.

In this exemplary training process 300, the text 310 and a plurality of songs 320 in a database are provided to a generator 330, where each song in the database is provided with a music style label, which may be manually labeled, or labeled by vector classification through a music style labeling model shown in FIG. 7 below.

In some examples, words in the text 310 and notes in each song 320 may be embedded in a dense vector space, then the attention mechanism 332 in the generator 330 may be used to connect the vector representation of the words in the text with the vector representation of notes in each song 320. Next, a similarity function 334, such as a cosine function, may be used to calculate the similarity between the vector representation of the words in the text 310 and the vector representation of the corresponding notes in the song, and then respective similarity between text 310 and a plurality of songs 320 may be calculated. The respective similarity between the text 310 and the plurality of songs 320 is provided to the selection module 336 to select one candidate song corresponding to the text according to the similarity based on any suitable ranking or scoring manner, and a candidate music style label 340 is output according to a music style label attached to the selected candidate song.

The candidate music style label 340 may be provided to a discriminator 350. In addition, a true music style label 360 corresponding to the text 310 in a training data may be provided to the discriminator 350. The discriminator 350 discriminates the candidate music style label 340 according to the true music style label 360 and outputs a discrimination result "true" or "false" 370 to indicate whether the candidate music style label 340 matches the true music style label 360. Further, the generator 330 and the discriminator 350 may be updated based on the discrimination result 370.

Figure 4:
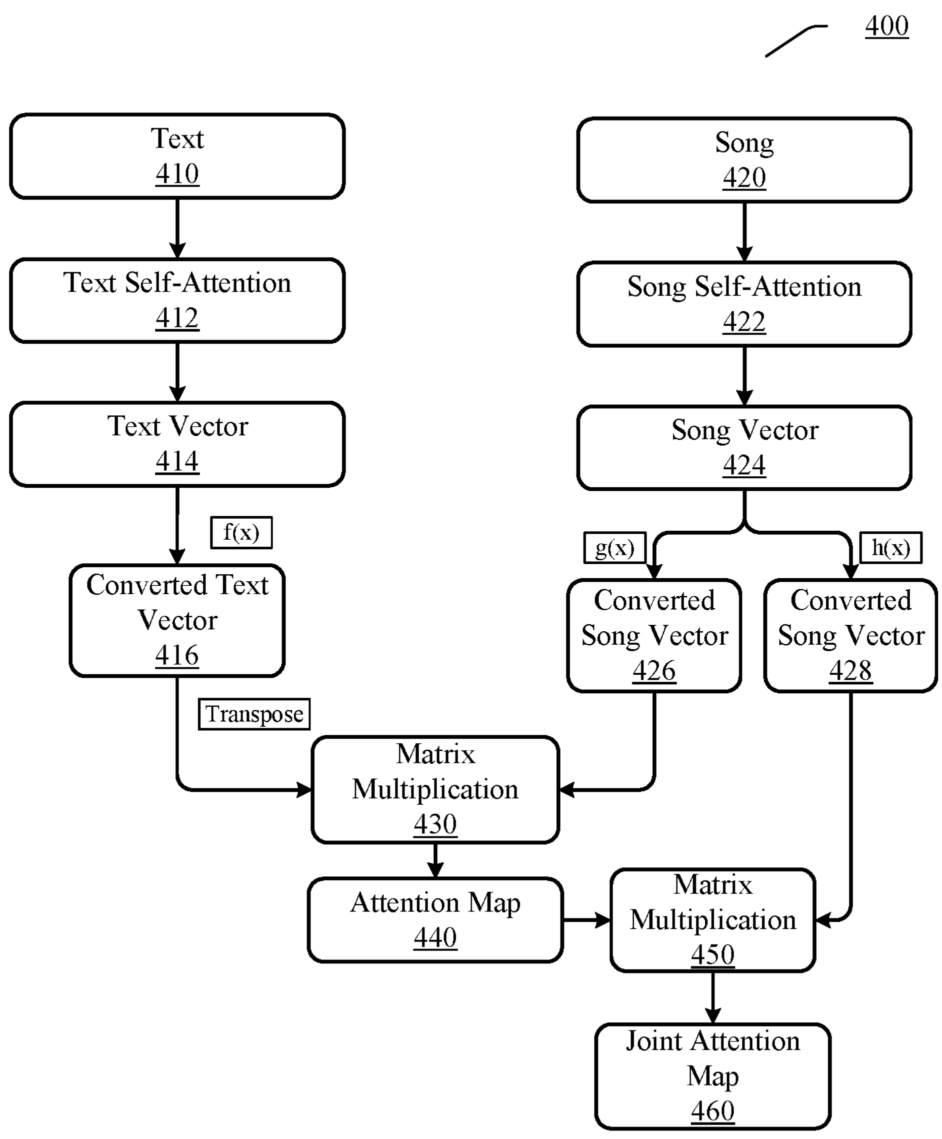
FIG. 4 illustrates an exemplary attention mechanism according to an embodiment.

FIG. 4 illustrates an exemplary attention mechanism 400 according to an embodiment. The attention mechanism 400 may correspond to the attention mechanism 332 in FIG. 3.

In one implementation, the attention mechanism 400 may include multiple types of attention, such as text self-attention, song self-attention, text-song joint attention, etc.

For text 410, text self-attention 412 may be performed on the text 410 to obtain a text vector 414. The text vector 414 may include a vector representation of the words in the text 410, where the vector representation of each word reflects relevance or matching degree with all other words in the text 410.

In one implementation, the text self-attention 412 may have a form of multi-head attention. The inputs to the multi-head attention may be represented as query Q, key K, and value V. Multi-head attention may be formed by multiple (for example, h) scaled dot product attention stacks. The inputs to each scaled dot product attention may also be Q, K, and V. Herein, each of Q, K, V may be all word embeddings of several (n) words in the text. For each scaled dot product attention, one word embedding is taken from Q at a time to check a matching degree with any other word embeddings, and the process may be performed n times. For the multi-head attention, linear transformations may be performed on Q, K, and V to obtain Q', K', and V', respectively. The scaled dot product attention may then be calculated for Q K', and V', and the calculation may be repeated h times. The h calculation results may be concatenated together and then a linear transformation may be performed. The result of the linear transformation is output of the multi-head attention. The output of text self-attention may be transformed from [batch size, maximum sequence length, word embedding dimension] to [batch size, maximum sequence length, number of heads*head embedding dimension]. For example, if the number of heads is 8, the output of text self-attention may be transformed from [64, 30, 512] to [64, 30, 8*64].

For a song 420, song self-attention 422 may be performed on the song 420 to obtain a song vector 424. The song vector 424 may include a vector representation of the notes or chords in the song 420, where the vector representation of each note reflects relevance or matching degree of the note with all other notes in the song 420. The song self-attention 422 is intended to establish relationships between respective notes of a song, and may be used, for example, to find the most suitable or relevant note in a song for the current note. In one implementation, the song self-attention 422 may also have a form of multi-head attention, which is similar to the multi-head attention for text self-attention 412 as discussed above. For example, a linear/non-linear transformation may be performed on a set of convolutional feature maps x corresponding to the vector representation of the notes in a song, respectively, to obtain, for example, a set of transformed x1, x2, x3. Next, x1 may be transposed and matrix-multiplied with x2, and the multiplication result may be normalized by Softmax to obtain the attention map. Based on the notes or chords, the attention map may be matrix-multiplied with x3 to obtain a set of self-attention feature maps.

In one implementation, text self-attention 412 and song self-attention 422 may be trained separately, and the text vector and song vector may be updated during the respective training process. In another implementation, text self-attention 412 and song self-attention 422 may also be jointly trained in the attention mechanism 400, and the text vector and song vector may be updated synchronously.

In the attention mechanism 400, three fully connected linear layers f(x), g(x), and h(x) may be applied to the text vector 414 and the song vector 424, respectively, to obtain a converted text vector 416, a converted song vector 426 and a converted song vector 428. Matrix multiplication 430 may be performed on the transpose of the converted text vector 416 and the converted song vector 426 to calculate the distance between them in a high-dimensional dense space. The result of the matrix multiplication 430 is a weight matrix that represents the distance between the notes of the song 420 and the semantics of the words of the text 410, which further forms the attention map 440. Matrix multiplication 450 may then be performed on the attention map 440 and the converted song vector 428 to further identify words that are most suitable or relevant for each note in the song, and eventually a joint attention map 460 may be obtained.

Figure 5:
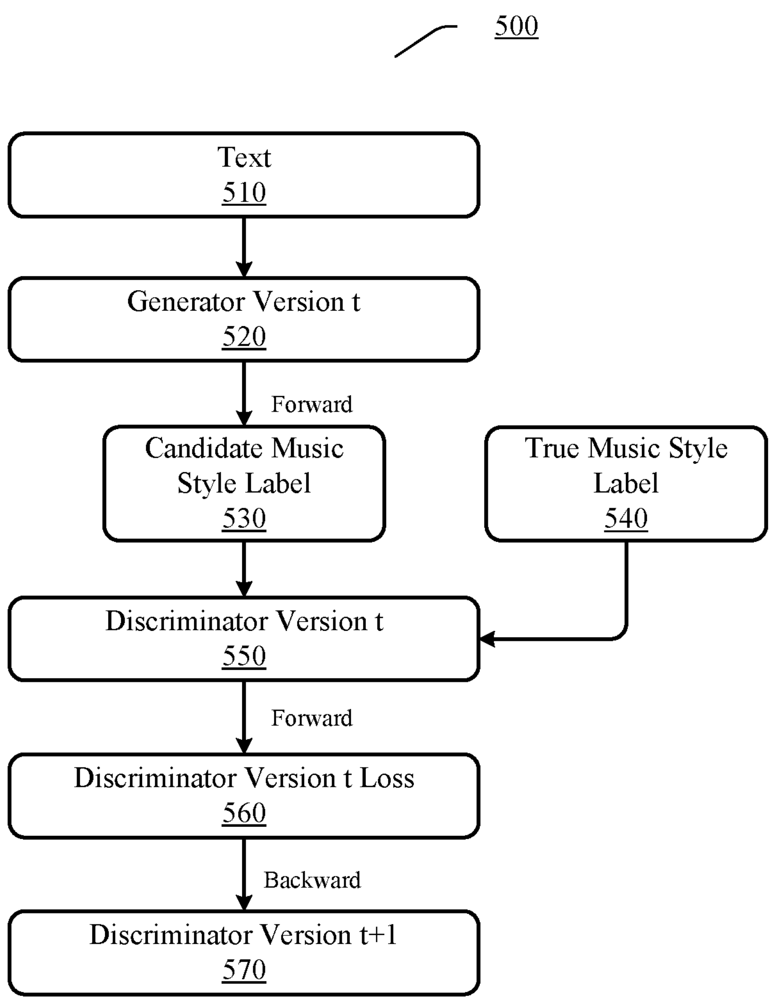
FIG. 5 illustrates an exemplary training process for a discriminator according to an embodiment.

FIG. 5 illustrates an exemplary training process 500 of a discriminator according to an embodiment, which may correspond to the discriminator 350 in FIG. 3. Specifically, FIG. 5 shows the forward process and backward process for training the discriminator from version t to version t+1. At block 510, input, for example, text input, may be obtained. At block 520, the text input may be provided to a generator version t. The generator version t may generate a candidate music style label 530 corresponding to the text input. The candidate music style label 530 may be provided to the discriminator version tin block 550. In addition, a song may be obtained from a database and a true music style label 540 may be extracted from the song. In block 550, a true music style label 540 may also be provided to the discriminator version t. The loss of the discriminator version t may then be calculated in block 560. The loss may be further used to update the discriminator to obtain the discriminator version t+1 at block 570.

Figure 6:
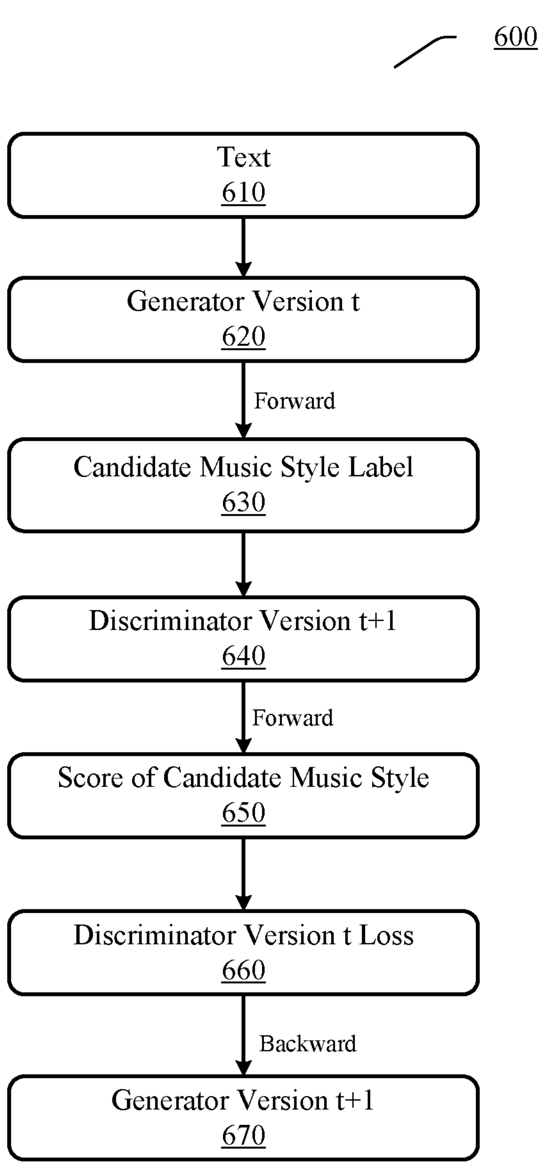
FIG. 6 illustrates an exemplary training process for a generator according to an embodiment.

FIG. 6 illustrates an exemplary training process 600 of a generator according to an embodiment, which may correspond to the generator 330 in FIG. 3. In particular, FIG. 6 shows the forward process and backward process for training the generator from version t to version t+1. At block 610, input, for example, text input, may be obtained. At block 620, the text may be provided to a generator version t. The generator version t may generate a candidate music style label 630. The candidate music style label 630 may be provided to the discriminator version t+1 in block 640. In block 650, the discriminator version t+1 may give a score for the candidate music style. This score may be further used to calculate the loss of the generator version t at block 660. The loss may be further used to update the generator to obtain the generator version t+1 at block 670.

It should be noted that the training process 500 of FIG. 5 and the training process 600 of FIG. 6 may be jointly performed to implement the training of the music style classification module 300 in FIG. 3.

Figure 7:
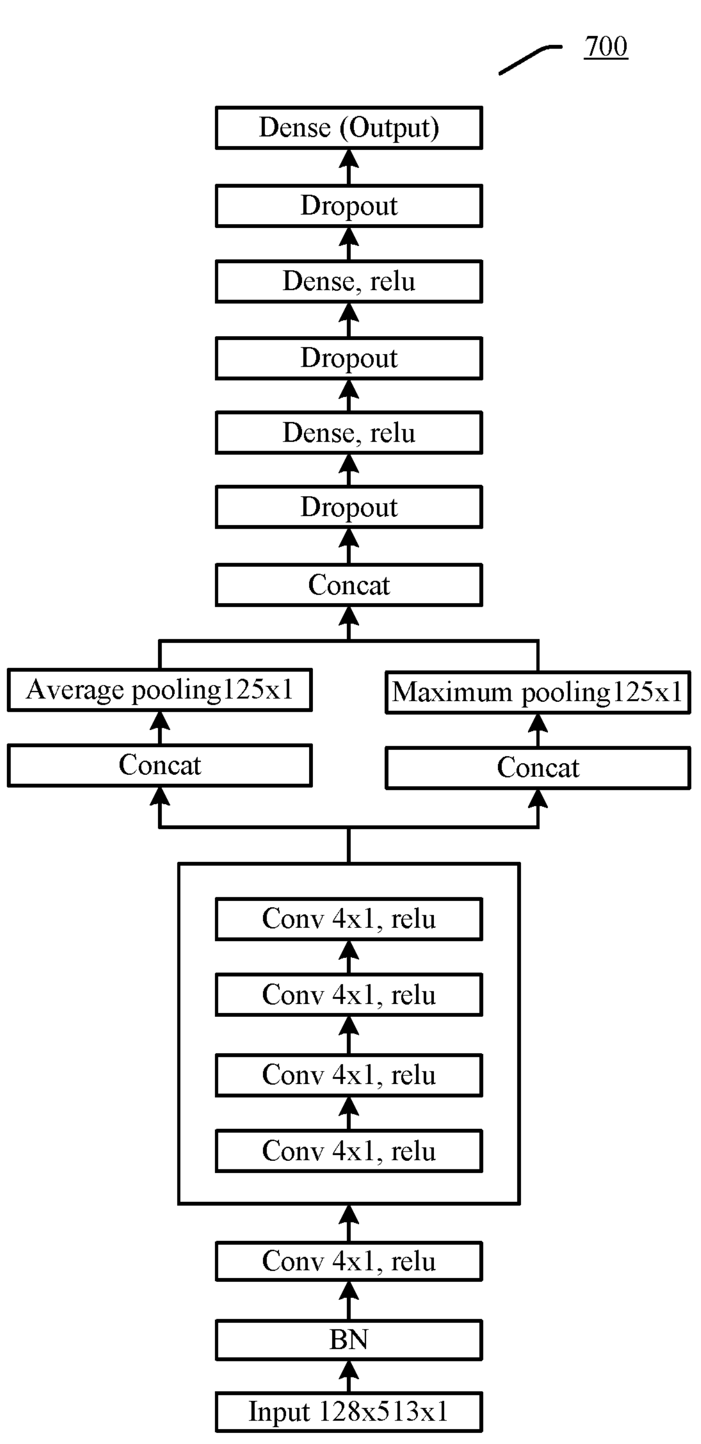
FIG. 7 illustrates an exemplary music style labeling model applied to a song according to an embodiment.

FIG. 7 illustrates an exemplary music style labeling model 700 applied to a song according to an embodiment. This music style labeling model can be used to add music style labels to songs in a database. The music style labeling model 700 may be implemented by a deep learning-based neural network. In one implementation, songs in audio form may be processed to obtain an n-dimensional array as input to the music style labeling model 700. For example, assuming that duration of an audio is 30 seconds, 3 seconds are intercepted every 1.5 seconds to perform a short-time Fourier transform to obtain a spectrogram. After transposing the spectrogram, a n-dimensional array of a form (128, 513, 1) may be obtained. In the music style labeling model 700, the input (128×513×1) is fed to a batch normalization (BN) layer, and further passes through several convolution layers (Cony) with modified linear units (ReLU). The output of the convolution layer is fed to different concatenating layers (Concat) respectively, and further provided to an average pooling layer and a maximum pooling layer. The output of the average pooling layer and the maximum pooling layer are provided to the concatenating layer and passed through multiple dropout layers (Dropout) and dense layers (Dense) with ReLUv, and finally a music style label in the form of vector is output in the dense layer.

Figure 8:
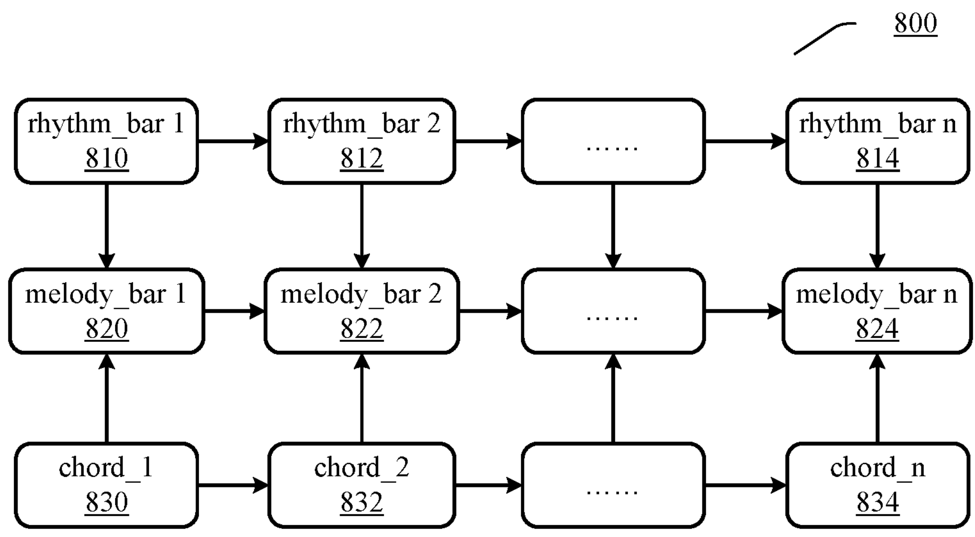
FIG. 8 illustrates an exemplary composition process for determining a melody according to an embodiment.

FIG. 8 illustrates an exemplary composition process 800 for determining a melody according to an embodiment. In an embodiment of the disclosure, the exemplary composition process 800 may include a rhythm sequence generation process, a chord sequence determination process, and a melody generation process.

In an example shown in FIG. 8, the rhythm sequence includes the rhythm of each bar of the song, represented as rhythm_bar 1 810, rhythm_bar 2 812, . . . rhythm_bar n 814. The rhythm sequence may be determined by the rhythm generation model according to the music style. In some implementations, for each music style, there is a corresponding language model in terms of rhythm, so that the corresponding rhythm may be determined according to the music style. In an implementation, for a current rhythm bar, the rhythm generation model may take a previous rhythm bar and a position of the current rhythm bar in the song to be generated as input to generate the current rhythm bar. In some examples, for example, in the case where the input provided by a user includes only text and no audio, for rhythm_bar 1, one may be weighted randomly selected from candidate rhythm bars as rhythm_bar 1 based on a music style determined according to text input. In some examples where the input provided by a user includes text and audio containing a reference melody, one or more initial bars of the rhythm may be generated based on the reference melody, and the subsequent bars are generated by the rhythm generation model based on the initial bars of the rhythm.

In the example shown in FIG. 8, the chord progression sequence includes the chords in each bar of the song, represented as chord_1 830, chord_2 832, . . . chord_n 834. In some implementations, the chords in the chord progression sequence may be randomly selected from a predetermined database, or may be determined from a predetermined database based on emotions extracted from text input. For example, a major triad may be chosen for happy emotions and a minor triad may be chosen for sad emotions.

In the example shown in FIG. 8, the melody may include the melody of each bar of the song, represented as melody_bar 1 820, melody_bar 2 822, . . . melody_bar n 824. The melody may be determined with a melody generation model by receiving a rhyme sequence and a chord progression sequence as input. In an implementation, each current melody bar may be determined based on the current rhythm bar, chord, and a possible previous melody bar. For example, melody_bar 1 820 may be generated based on rhythm_bar 1 810 and chord_1 830, melody_bar 2 822 may be generated based on a previous melody_bar 1 820, the current rhythm_bar 2 812, and chord_2 832, and so on.

Figure 9:
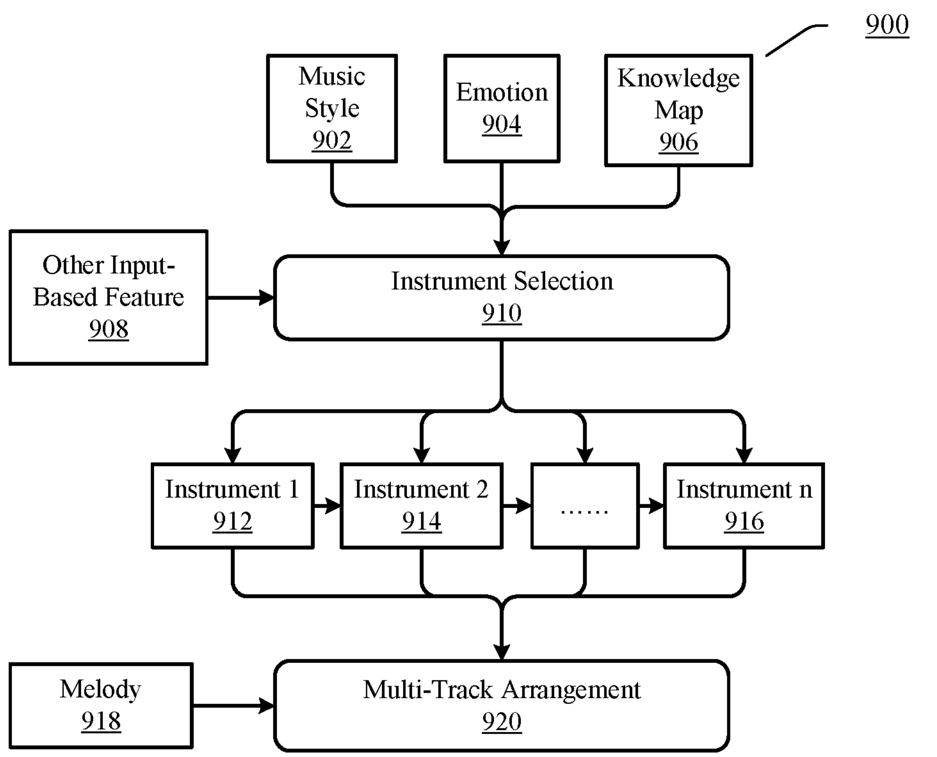
FIG. 9 illustrates an exemplary arrangement process according to an embodiment.

FIG. 9 illustrates an exemplary arrangement process 900 according to an embodiment. In an embodiment of the disclosure, the exemplary arrangement process 900 may include an instrument selection process 910 and a multi-track arrangement process 920.

In the instrument selection process 910, a suitable instrument set, such as instrument 1 912, instrument 2 914, . . . , instrument n 916, may be generated or selected according to any one or more of a music style 902, an emotion 904, a knowledge map 906, and other features 908 in possible user input. As mentioned above, the music style 902 may be determined based on the text input of user, such as topics and emotions extracted from the text input; the emotion 904 may be extracted from the text input of user; the knowledge map 906 may be pre-created; and other features 908 in the user input may include a name of the instrument mentioned in text input or the instrument involved in the audio input, and so on.

In an implementation, with a selected instrument set, in the multi-track arrangement process 920, respective parts or bars of the melody may be arranged to generate an arrangement track, and align different arrangement tracks in time with the melody. For example, referring to the foregoing steps for generating arrangement track in block 270 of FIG. 2, in the multi-track arrangement process 920 in FIG. 9, the arrangement of, for example, the instrument 1 in the current bar of the melody may be as follows: the current melody bar is Mc, and the instrument set selected in the previous bar of melody 918 are instrument 1, instrument 3, and instrument n, where the note sequence played by the instrument 1 is NP1, the note sequence played by the instrument 3 is NP3, and the note sequence played by the instrument n is NPn, the instrument 1 may be arranged in the current bar with a machine learning model according to the current melody bar Mc and the note sequences NP1, NP3, and NPn of all instruments selected in the previous bar, for example, the note sequence NC1 of instrument 1 may be generated, as a part of the arrangement track corresponding to the instrument 1.

Figure 10:
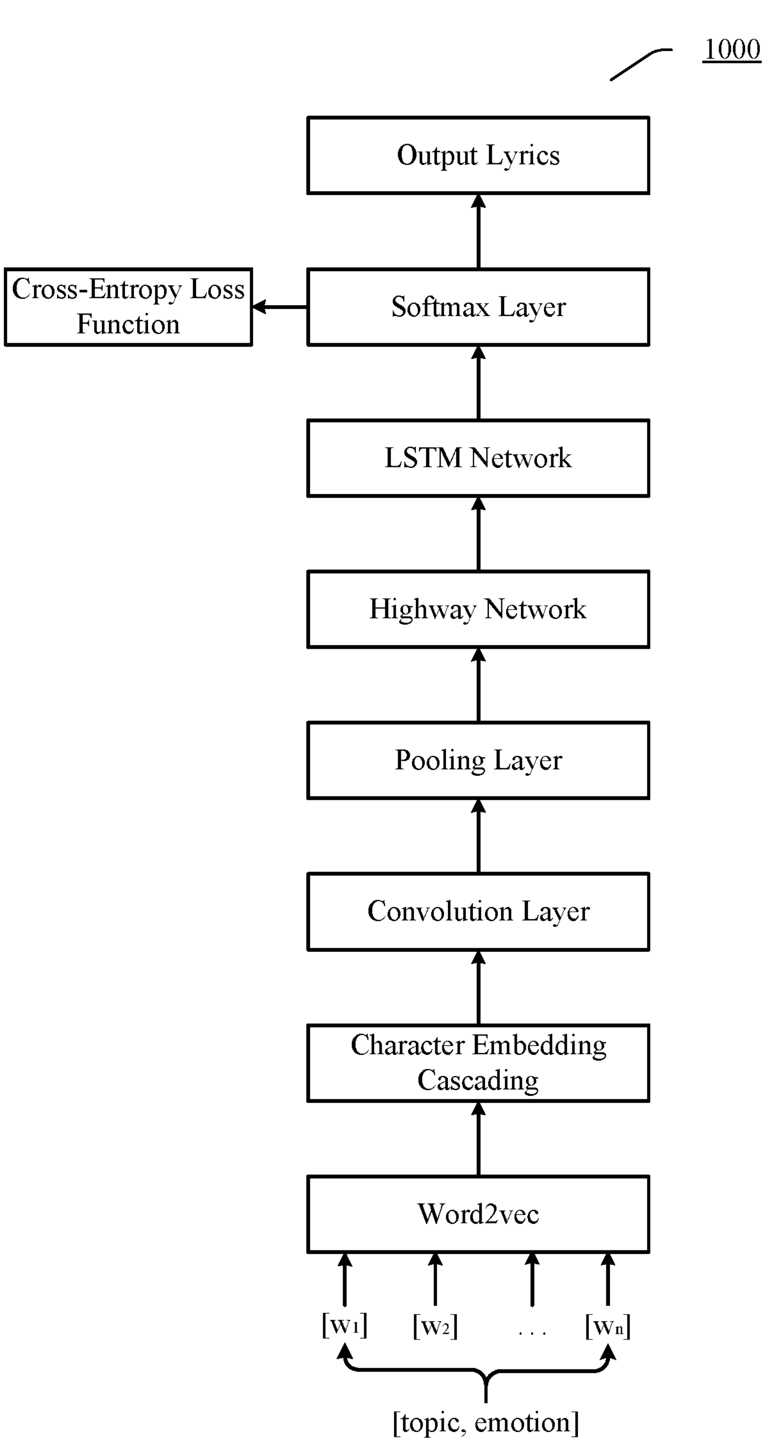
FIG. 10 illustrates an exemplary lyrics generation process according to an embodiment.

FIG. 10 illustrates an exemplary lyrics generation process 1000 according to an embodiment. The exemplary lyrics generation process 1000 may be performed by a lyrics generation model, where the lyrics generation model may be implemented by using a character-level recurrent convolutional network.

In an implementation, the lyrics generation model uses word2vec to semantically extend the topics and emotions of the word form to obtain a topic extension set and an emotion extension set, respectively. In some examples, the topic extension set and the emotion extension set are passed through a character embedding cascading layer, a convolution layer, a pooling layer, a Highway network, a LSTM network, a Softmax layer to output lyrics. In some examples, the Highway layer makes it possible to adaptively transfer some dimensions of the input directly to the output during the training of a deep network. Further, the output of the Softmax layer may be fed to a cross-entropy loss function to calculate the loss. In an implementation, the loss may be used to update the lyrics generation model.

FIGS. 11A-11C illustrate an exemplary interfaces 1110, 1120, 1130 of an application for generating a song according to an embodiment. The above exemplary interfaces 1110, 1120, 1130 illustrate a process for providing a generated songs based on a user input in a stand-alone application.

In an interface 1110 of FIG. 11A, a prompt may be presented to request the user to input a description about the song to be generated, for example, "Please enter text or keywords for generating a song" indicated by 1112. In FIG. 11A, the user may input text or keywords for generating a song in an input box 1114 below the prompt. It should be understood that although the input box 1114 is shown below the prompt 1112 in FIG. 11A, it may be located at any other position in the interface 1110. Optionally, in the interface 1110, there may be an input box 1116 for providing a reference melody. In the input box 1116, the user may be prompted to provide a reference melody, for example, an exemplary prompt "Please provide a reference melody for generating a song". If a reference melody needs to be provided by the user, it may be provided in any suitable way. As shown in the examples herein, the user may provide a reference melody by humming, for example, via a microphone-style button in the input box 1116, or by uploading a piece of audio or song, such as via the "Upload" button in the input box 1116. The above two ways of providing a reference melody are merely exemplary, and do not place any limitation on the way of providing a reference melody. After the user has entered text or keywords and optionally provided a reference melody, the user may determine to start generating a song, for example, by clicking a confirmation button, such as the button "Start Generation" or "OK" button indicated by 1118, or by expressing the intention of user to start generating a song in other ways, for example, after a predetermined period of time after entering text, it is started to generate a song automatically without clicking the confirmation button by the user.

In the interface 1120, the user may enter the text "Today is sunny" at a input box 1122 to indicate that the user wants to obtain a song related to the text. In this example, the user does not provide a reference melody, but in other examples, the user may provide a reference melody. After receiving the input of the user, a song generation process may be performed according to an embodiment of the disclosure. In the interface 1130, a song generation process may be optionally displayed to the user, such as "song generation completed" or "song is being generated" indicated by 1132, and the like. In the example shown herein, the generated song can be played, for example, by clicking the button "play" shown in 1134, or by being played directly without any user action after a predetermined period of time after the song generation is completed. In other examples, the generated songs can be presented in the interface in the form of a link, which is not shown in the figure. Optionally, after the song is generated, a music sheet of the song may be provided in the interface for the user to view, as indicated by the display box 1136, where the music sheet includes at least melody and lyrics of the song. Optionally, a "save" button 1138 may be provided in the interface, so that the user can download or store an audio file, a music sheet of a song, and so on.

In addition, the song generation process may also occur during a human-machine interaction conversation, and the generated song may be presented to the user through a conversation interface. As shown in FIG. 12, which illustrates an exemplary interface 1200 for generating a song during a chatting process with a chat bot according to an embodiment.

In the interface 1200 of FIG. 12, during chatting with the chat bot, the user proposes that he wants to compose a song and provides the chat bot with keywords for generating the song. The chat bot can provide the received keywords to the song generation system and present a song generated by the song generation system to the user in a conversation interface, for example, in the form of audio playback, and optionally to display a music sheet of the song to the user in the form of text or pictures.

Figure 13:
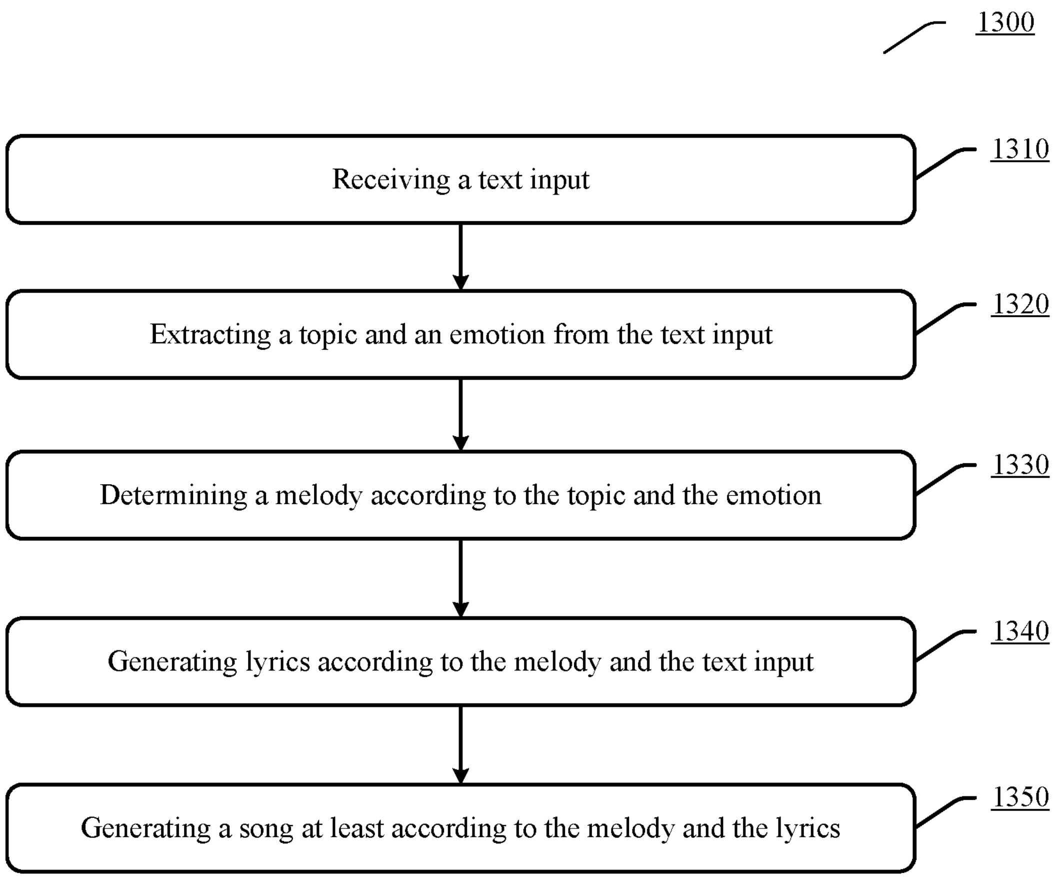
FIG. 13 illustrates a flowchart of an exemplary method for song generation according to an embodiment.

FIG. 13 illustrates a flowchart of an exemplary method 1300 for song generation according to an embodiment.

At block 1310, a text input may be received.

At block 1320, a topic and an emotion may be extracted from the text input.

At block 1330, a melody may be determined according to the topic and the emotion.

At block 1340, lyrics may be generated according to the melody and the text input.

At block 1350, the song may be generated at least according to the melody and the lyrics.

In an implementation, determining the melody further comprises: determining a music style according to the topic and the emotion; determining a rhyme sequence according to the music style; determining a chord progression sequence according to the emotion; and determining the melody according to the rhyme sequence and the chord progression sequence.

In an implementation, determining the music style further comprises: identifying an intention according to the topic; and determining the music style according to the intention and the emotion.

In an implementation, identifying the intention further comprises: detecting an application scenario of the song; and identifying the intention according to the application scenario and the topic.

In a further implementation, the method 1300 further comprises: receiving an audio input; and detecting a reference melody from the audio input, wherein the melody is determined further according to the reference melody.

In an implementation, generating the lyrics further comprises, as for each bar of the melody: generating at least one candidate lyrics according to the text input; and selecting one candidate lyrics matching length of the bar of the melody from the at least one candidate lyrics.

In an implementation, generating the at least one candidate lyrics further comprises: extracting keywords from the text input; and generating the at least one candidate lyrics according to the keywords and the emotion.

In another implementation, generating the at least one candidate lyrics further comprises: obtaining a topic extension set by semantically extending the topic; obtaining an emotion extension set by semantically extending the emotion; and generating the at least one candidate lyrics according to the topic extension set and the emotion extension set.

In an implementation, generating the song further comprises: generating at least one arrangement track according to the melody; generating a singing track according to the melody and the lyrics; and generating the song according to the at least one arrangement tracks and the singing track.

In a further implementation, generating the at least one arrangement track further comprises: determining a music style according to the topic and the emotion; selecting at least one instrument at least according to the music style; and generating the at least one arrangement track with the at least one instrument.

In an implementation, generating the singing track further comprises: singing the lyrics with sound of a singer according to the melody.

In a further implementation, the method 1300 further comprises: providing a music sheet of the song, wherein the music sheet comprises at least the melody and the lyrics.

In a further implementation, the method 1300 further comprises: providing the song through a link and/or direct play.

In a further implementation, the method 1300 further comprises: providing the song in an independent application or in a human-machine interaction conversation.

It should be understood that the method 1300 may further include: any step/process for song generation according to the embodiments of the disclosure as mentioned above.

Figure 14:
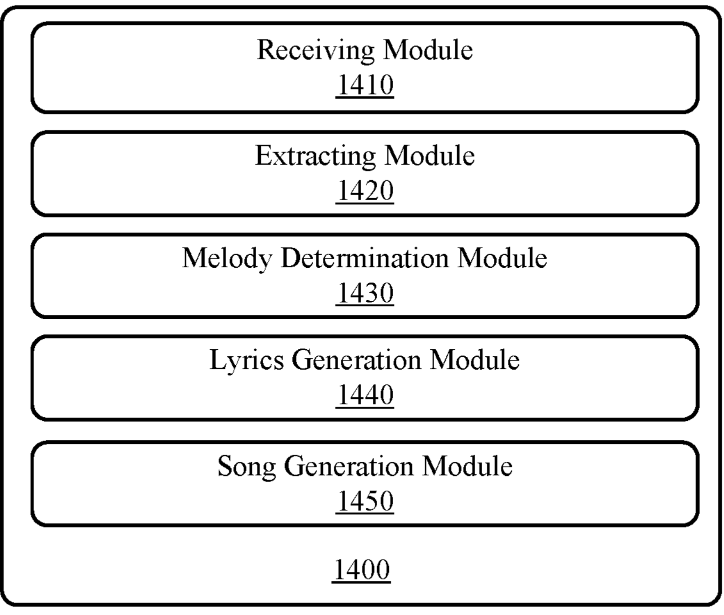
FIG. 14 illustrates an exemplary apparatus for song generation according to an embodiment.

FIG. 14 illustrates an exemplary apparatus 1400 for song generation according to an embodiment.

The apparatus 1400 may comprise: a receiving module 1410, for receiving a text input; an extracting module 1420, for extracting a topic and an emotion from the text input; a melody determination module 1430, for determining a melody according to the topic and the emotion; a lyrics generation module 1440, for generating lyrics according to the melody and the text input; and a song generation module 1450, for generating the song at least according to the melody and the lyrics.

In an implementation, the melody determination module 1430 is further for: determining a music style according to the topic and the emotion; determining a rhyme sequence according to the music style; determining a chord progression sequence according to the emotion; and determining the melody according to the rhyme sequence and the chord progression sequence.

In an implementation, the lyrics generation module 1440 is further for, as for each bar of the melody: generating at least one candidate lyrics according to the text input; and selecting one candidate lyrics matching length of the bar of the melody from the at least one candidate lyrics.

In an implementation, the song generation module 1450 is further for: generating at least one arrangement track according to the melody; generating a singing track according to the melody and the lyrics; and generating the song according to the at least one arrangement tracks and the singing track.

In an implementation, the apparatus 1400 further comprises: a music sheet providing module, for providing a music sheet of the song, wherein the music sheet comprises at least the melody and the lyrics.

It should be understood that the apparatus 1400 may further include: any other modules configured for generating a song according to the embodiments of the disclosure as mentioned above.

Figure 15:
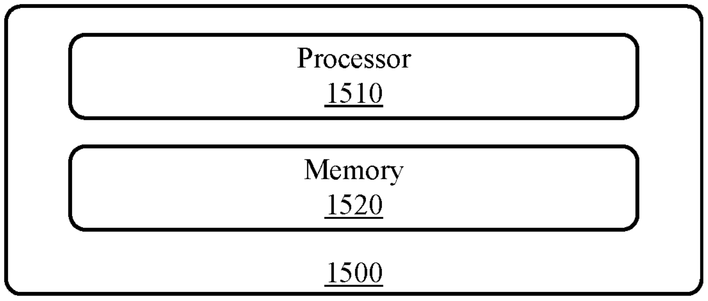
FIG. 15 illustrates another exemplary apparatus for song generation according to an embodiment.

FIG. 15 illustrates another exemplary apparatus 1500 for song generation according to an embodiment. The apparatus 1500 may comprise one or more processors 1510, and a memory 1520 storing computer-executable instructions that, when executed, cause the one or more processors 1510 to: receive a text input; extract a topic and an emotion from the text input; determine a melody according to the topic and the emotion; generate lyrics according to the melody and the text input; and generate a song at least according to the melody and the lyrics.

Embodiments of the present disclosure may be implemented in a non-transitory computer readable medium. The non-transitory computer readable medium can include instructions that, when executed, cause one or more processors to perform any operation of a method for song generation according to embodiments of the disclosure as described above.

It should be appreciated that all the operations in the methods described above are merely exemplary, and the present disclosure is not limited to any operations in the methods or sequence orders of these operations, and should cover all other equivalents under the same or similar concepts. It should also be appreciated that all the modules in the apparatuses described above may be implemented in various approaches. These modules may be implemented as hardware, software, or a combination thereof. Moreover, any of these modules may be further functionally divided into sub-modules or combined together.

The term “exemplary” used in this application means serving as an example, illustration, or description. Any embodiment or design described as “exemplary” in this application should not be construed as preferred or advantageous over other embodiments or designs. Rather, the use of an exemplary term is intended to convey the idea in a specific manner. The term “or” used in this application means an inclusive “or” rather than an exclusive “or”. That is, “X uses A or B” means any natural inclusive permutation unless otherwise specified or clear from the context. That is, if X uses A, X uses B, or X uses both A and B, “X uses A or B” satisfies any of the above examples. In addition, “a” and “an” items used in this application and the appended claims usually mean “one or more”, unless otherwise specified or clear from the context that it is a singular form.

Processors are described in connection with various apparatus and methods. These processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on computer readable medium. Computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the present disclosure, which are known or to be apparent to those skilled in the art are intended to be covered by the claims.

The invention claimed is:

1. A computer-implemented method for song generation, comprising:

receiving a text input;

classifying the text input using a trained classifier to extract a topic and an emotion from the text input, wherein the trained classifier applies a multi-dimensional emotion category label corresponding to a vector representation of the text input;

using a deep neural network model to determine an intention based on the topic, wherein the deep neural network model determines the intention based on pre-trained associations between user text inputs and intentions;

determining, using processing circuitry, a music style according to the intention and the emotion;

determining, using processing circuitry, a melody according to the topic, the music style, and the emotion, wherein determining the melody includes:

determining a chord progression sequence according to the emotion;

determining a rhyme sequence according to the music style; and determining the melody according to the rhyme sequence and the chord progression sequence;

generating lyrics according to the melody and the text input;

generating a song at least according to the melody and the lyrics; and outputting the song as a playable audio file or a music sheet comprising the melody and lyrics.

2. The method of claim 1, wherein identifying the intention further comprises:

detecting an application scenario of the song; and identifying the intention according to the application scenario and the topic.

3. The method of claim 1, further comprising:

receiving an audio input; and detecting a reference melody from the audio input, wherein the melody is determined further according to the reference melody.

4. The method of claim 1, wherein generating the lyrics further comprises, as for each bar of the melody:

generating at least one candidate lyrics according to the text input; and selecting one candidate lyrics matching length of the bar of the melody from the at least one candidate lyrics.

5. The method of claim 4, wherein generating the at least one candidate lyrics further comprises:

extracting keywords from the text input; and generating the at least one candidate lyrics according to the keywords and the emotion.

6. The method of claim 4, wherein generating the at least one candidate lyrics further comprises:

obtaining a topic extension set by semantically extending the topic;

obtaining an emotion extension set by semantically extending the emotion; and generating the at least one candidate lyrics according to the topic extension set and the emotion extension set.

7. The method of claim 1, wherein generating the song further comprises:

generating at least one arrangement track according to the melody;

generating a singing track according to the melody and the lyrics; and generating the song according to the at least one arrangement tracks and the singing track.

8. The method of claim 7, wherein generating the at least one arrangement track further comprises:

determining a music style according to the topic and the emotion;

selecting at least one instrument at least according to the music style; and generating the at least one arrangement track with the at least one instrument.

9. The method of claim 7, wherein generating the singing track further comprises:

singing the lyrics with sound of a singer according to the melody.

10. The method of claim 1, further comprising:

providing a music sheet of the song, wherein the music sheet comprises at least the melody and the lyrics.

11. The method of claim 1, further comprising:

providing the song in an independent application or in a human-machine interaction conversation.

12. An apparatus for song generation, comprising:

a receiving module, for receiving a text input;

a trained classifier to classify the text input, wherein the trained classifier applies a multi-dimensional emotion category label corresponding to a vector representation of the text input;

an extracting module, for extracting a topic and an emotion from the text input;

a deep neural network model to determine an intention based on the topic, wherein the deep neural network model determines the intention based on pre-trained associations between user text inputs and intentions;

a music style determination module, for determining a music style according to the intention and the emotion;

a melody determination module, for determining a melody according to the topic, the music style, and the emotion, wherein determining the melody includes;

determining a chord progression sequence according to the emotion;

determining a rhyme sequence according to the music style; and determining the melody according to the rhyme sequence and the chord progression sequence;

a lyrics generation module, for generating lyrics according to the melody and the text input; and a song generation module, for generating a song at least according to the melody and the lyrics;

wherein the music style determination module is further to output the song as a playable audio file or a music sheet comprising the melody and lyrics.

13. An apparatus for song generation, comprising:

one or more processors; and a memory storing computer-executable instructions that, when executed, cause the one or more processors to:

receive a text input;

classify the text input using a trained classifier to extract a topic and an emotion from the text input, wherein the trained classifier applies a multi-dimensional emotion category label corresponding to a vector representation of the text input;

determine, using a deep neural network model, an intention based on the topic, wherein the deep neural network model determines the intention based on pre-trained associations between user text inputs and intentions;

determine a music style according to the intention and the emotion;

determine a melody according to the topic, the music style, and the emotion, wherein determining the melody includes:

determining a chord progression sequence according to the emotion;

determining a rhyme sequence according to the music style; and determining the melody according to the rhyme sequence and the chord progression sequence;

generate lyrics according to the melody and the text input;

generate a song at least according to the melody and the lyrics; and output the song as a playable audio file or a music sheet comprising the melody and lyrics.

* * * * *